United States Patent [19]

Matsuda et al.

[11] Patent Number: 4,858,824

[45] Date of Patent: Aug. 22, 1989

[54] AIR CONDITIONER

[75] Inventors: Kenji Matsuda, Shizuoka; Sakuo Sugawara; Masanori Hara, both of Kanagawa; Hiroyuki Umemura, Shizuoka; Hidenori Ishioka, Shizuoka; Katsuyuki Aoki, Shizuoka, all of Japan

[73] Assignee: Mitsubishi Denki Kabushiki Kaisha, Tokyo, Japan

[21] Appl. No.: 53,351

[22] Filed: May 22, 1987

[30] Foreign Application Priority Data

May 23, 1986 [JP] Japan .................................. 61-118610
May 28, 1986 [JP] Japan .................................. 61-122811

[51] Int. Cl.$^4$ ............................................. G05D 23/00
[52] U.S. Cl. ........................................ 236/94; 165/12; 236/78 D
[58] Field of Search ..................... 236/94, 78 R, 78 D; 165/12

[56] References Cited

U.S. PATENT DOCUMENTS 4,715,191 12/1987 Umemura et al. ................. 236/94 X Primary Examiner—William E. Wayner
Attorney, Agent, or Firm—Gifford, Groh, Sheridan, Sprinkle & Dolgorukov

[57] ABSTRACT

The air conditioner comprises a manual or automatic sensible temperature detection decision means consisting of a temperature detector for detecting room temperature, a hot/cold selector switch, a radiant heat detector, an air current detector and an outdoor temperature detector, an analog/digital signal converter, a microcomputer, a compressor and a blower, which is characterized in that temperature can be set to a thermal sense of a user, room temperature is automatically regulated step by step to coincide with the set temperature, or a sensible temperature is set automatically by the temperature detection and setting function and thus kept constant at all times.

2 Claims, 13 Drawing Sheets

AIR CONDITIONER

BACKGROUND OF THE INVENTION

Industrial Field of the Invention

The present invention relates to an air conditioner, and is particularly concerned with an air conditioner whereby a comfortable environment adjusted to the intention of a user is provided, and also a sensible temperature is controlled to be constant at all times.

Prior Art

FIG. 11 is an electric circuit diagram of a prior art air conditioner, FIG. 12 is a block diagram of a switch part thereof, and in the drawings, 1 denotes a switch part or a plurality of switch input parts indicating a thermal sense, the switch part 1 comprising a "when hot" switch 1a and a "when cold" switch 1b, 2 denotes a microcomputer or a computer to which an output from the switch part 1 is inputted, the microcomputer 2 having a set temperature decision means, 3 denotes an input circuit incorporated in the microcomputer 2, 4 denotes a CPU in the microcomputer 2 in which the input circuit 3 is incorporated, 5 denotes a memory in the microcomputer 2 in which the CPU 4 is incorporated, 6 denotes an output circuit of the CPU, 7 denotes an operation switch of the microcomputer 2 in which the output circuit 6 is incorporated, 8 denotes a thermoresistance element such as thermistor or the like which is a temperature detector for detecting room temperature so as to compare room temperature of a room to be air-conditioned (not indicated) with the set temperature by turning the operation switch 7 to start a flow shown in FIG. 13, 9 denotes an analog/digital converter for converting a voltage value fluctuating according to room temperature detected on the thermoresistance element 8 into a digital signal, 10 denotes a compressor controlled for operation through the output circuit 6 after outputs of the A/D converter 9 and the switch input part 1 are inputted to the microcomputer 2 to a comparison between the set temperature and room temperature, and an arrangement is such that an input of the switch part 1 and an output of the thermoresistance element 8 working as a temperature detector for detecting room temperature are inputted to the input circuit 3 of the microcomputer 2 through the A/D converter 9, and the compressor 10 is controlled for operation according to an output of the output circuit 6.

Next, an operation will be described with reference to FIG. 13. FIG. 13 is a flowchart including a program for deciding the set temperature stored in the memory 5 of the microcomputer 2.

The case of heating operation is exemplified.

A flow shown in FIG. 13 starts from turning on the operation switch 7. An initialized temperature is set at STEP 31. Room temperature detected on the thermoresistance element 8 is inputted at STEP 32, the set temperature and room temperature are compared at STEP 33, and on or off command of the compressor 10 is issued through the output circuit 6 as STEP 34 or 35 according to an operation mode. Steps 36 to 39 indicate a flow as a set temperature decision means and when there is present a switch input at STEP 36, whether the input is a "when hot" switch input or a "when cold" switch input will be decided at STEP 37. In case "when hot" switch being on is decided at STEP 38, the set temperature is then lowered by a constant value or 2 deg., for example, with reference to the then room temperature. If instead the comparison "when cold" switch being on is decided, the set temperature is raised by a constant value or 2 deg., for example, with reference to the then room temperature at STEP 39. From next on, the compressor is controlled for operation again on the flow from STEP 32 at the modified set temperature, and thus the environment is controlled by a new set temperature and room temperature.

As described above, the prior art air conditioner is only for modifying a set temperature by a constant amount at the time of inputting "when hot" switch and "when cold" switch, therefore room temperature does not change right away, the set temperature is not modified immediately after the input, and reinputting "hot" switch and "cold" switch is not to obtain an optimum set temperature straight for users.

FIG. 1 represents a control circuit of an air conditioner shown in in the Japan Official Gazette of Patent Applications as No. 59-50899. FIG. 1 is thus prior art. However, it shows elements common to the instant invention, and an understanding thereof is necessary before proceeding to an appreciation of the instant invention. In the drawing, reference numerals 51, 52 denote first resistances for room temperature consisting of thermistor and others which are connected in series between a power terminal +B and a ground to form a room temperature detecting unit. A reference numeral 53 denotes an analog switch with its one contact 53a connected to a junction of the room temperature sensor 51 and the first resistance 52. 54 denotes a temperature setting variable resistance connected between another contact 53b of the analog switch 53 and the ground, and its one end connected to the other contact 53b is connected to the power terminal +B through a second resistance 55, thus forming a temperature setting part. A reference numeral 56 denotes an A/D converter connected to the analog switch 53. 57 denotes a microcomputer consisting of one chip which is connected between the analog switch 53 and the A/D converter 56, and operates for controlling operation of a fan motor and a computer motor to be described herein later. Reference numerals 58, 59 denote an operation switch and a stop switch respectively which are connected between a power terminal +B and the microcomputer 57, and each one end connected to the microcomputer 57 is grounded through third and fourth resistances 60, 61. Reference numerals 62, 63 denote a timer switch and a timer setting slide switch respectively which are connected between a power terminal +B and the microcomputer 57. Numerals 64, 65, 66, 68, 69, 70 denote fifth to eleventh resistances connected between the timer switch 62 and a junction with the microcomputer 57 and a ground, and also between each junction of each one terminal of the slide switch 63 and the microcomputer 57 and a ground. A timer setting part or section is formed of the timer switch 62, the slide switch 63 and each of the resistances 64 to 70.

A reference numeral 71 denotes a switching first transistor with the base connected to a first output terminal 57a of the microcomputer 57 through a biasing twelfth resistance 72 and an emitter which is grounded. A reference numeral 73 denotes a thirteenth resistance connected between the base and the emitter of the first transistor 71, 74a denotes a first relay coil connected between a power terminal +B and a collector of the first transistor 71. 75 denotes a first diode connected in parallel with the first relay coil 74a. Numerals 74b and 76 denote a first relay contact and a fan motor connected in series between both power terminals +B and −B and a fan motor feeding control part is formed of the first relay and the transistor 71.

A reference numeral 77 denotes a switching second transistor with the base connected to a second output terminal 57b of the microcomputer 57 through a biasing fourteenth resistance 78, and an emitter which is grounded. A reference numeral 79 denotes a fifteenth resistance connected between the base and the emitter of the second transistor 77. 80a denotes a second relay coil connected between a power terminal +B and a collector of the second transistor 77, 81 denotes a second diode connected in parallel with the second relay coil 80a. 80b and 82 denote a second relay contact and a compressor respectively which are connected in series between both power terminals +B and −B, and a compressor feeding control part is formed of the transistor 77 and the second relay.

Then, the microcomputer 57 is provided with a temperature comparison means for comparing a temperature of the room temperature detecting unit inputted through the converter 56, or a detected room temperature with a set temperature of the setting part inputted through the converter 56, a timer counter means for counting a timer time set by the timer setting part, a temperature comparison means, a discriminating means to which an output of the timer setting part is inputted and others.

The temperature comparison means has a memory for retaining the set temperature, and the discriminating means has a discriminating function when room temperature exceeds the set temperature acording to an output of the temperature comparison means and also comes lower than the set temperature by a pre-determined temperature or 2° C., a discriminating function whether or not the timer is operating, and a controlling function for controlling operation of both the motor feeding control parts according to outputs of both discriminating functions and a data of the control means set beforehand.

Next, a function will be described with reference to the flowchart shown in FIG. 2.

First, a power supply is closed, and the analog switch 53 is connected to the other contact 53b to adjust the variable resistance 54, then a voltage divided by the second resistance 55 and the variable resistance 54 is inputted as a set temperature to the temperature comparison means of the microcomputer 57 through the analog switch 53 and the A/D converter 56, the set temperature is stored in a memory of the temperature comparison means, and thus 27° C. is set (S-50) as indicated by a one-dot chain line of FIG. 3 (a) and so stored in the memory.

Next, if the operation switch 58 is depressed at t0 shown in FIG. 3 (S-51), a fan motor drive signal is generated from the discriminating means of the microcomputer 57 to the first transistor 71 through the first output terminal 57a, the first transistor 71 is thus turned on, a current flows from the power terminal +B to the first transistor 71 by way of the first relay coil 74a, the first relay contact 74b is closed to drive the fan motor 76 (S-52), and thus the fan motor 76 is actuated to a blast operation as shown in FIG. 3 (b).

Next, from depressing the timer switch 62 after the timer time is set at t5, for example, by the slide switch 63 (S-53), a time counting is commenced by a timer counter means of the microcomputer 57 (S-54), a timer operation is commenced (S-55), and until the timer set time passes at t5 (S-56), whether or not room temperature detected on the room temperature sensor 51 is higher than a temperature set at 27° C. and so stored is compared on a temperature comparison means of the microcomputer 57 (S-57).

Then, as shown in FIG. 3 (a) and (c), when room temperature is higher than the set temperature 27° C. (S-57), a compressor drive command signal is output to the second transistor 77 from the discriminating means of the microcomputer 57 through the second output terminal 57b, the second transistor is turned on to carry a current to the second relay coil 80a, the second relay contact 80b is closed to feed the current to the compressor 2, and thus the compressor 82 is driven to a cooling operation (S-58, 59).

On the other hand, when room temperature becomes lower than 27° C. (S-57), the discriminating means of the microcomputer 57 outputs an instruction to stop the compressor, the compressor drive command signal of the second output terminal 57b goes out, the current is not carried to the second relay coil 80a, the contact 80b is opened, and thus the compressor 82 is stopped operating (S-60).

That is, while room temperature is approaching 25° C. or 2° C. lower than the set temperature 27° C. (S-61, 62), the discriminating means of the microcomputer 57 controls the compressor 82 for operation on an output of the temperature comparison means. Then, the fan motor 76 is kept running (S-b 52).

During operation of the timer (S-61) when room temperature drops to 25° C. at t3′ to be lower than the set temperature 27° C. by 2° C. (S-62), the discriminating means outputs commands to stop the fan motor and the compressor, fan motor and compressor drive command signals are not output from the output terminals 57a, 57b, both the motors 76, 82 stop as shown in FIG. 3 (b) and (c) and thus the air conditioner is shut down totally (S-63), and if room temperature does not return to the set temperature 27° C. during the period t3 to t5, or from t3 until the timer set time is over (S-64) as shown in FIG. 3 (a), both the motors 76, 82 are kept stopping and the air conditioner is thus retained shut down entirely.

Then, as shown in FIG. 4, the timer time is set to T3 on the slide switch 63, and in case room temperature comes up to 25° C. at T1 and then gets higher again than the set temperature 27° C. at T2 within the timer set time T3, it operates as in the case of FIG. 3 during the period T0 to T2, and the fan motor 76 comes to stop at T1 to T2.

Then, at the time T2 when room temperature rises again to 27° C., the discriminating means removes the stop command of the fan motor 76, the fan motor drive command signal is again output from the output terminal 57a to drive the fan motor 76 again, the discriminating means removes the compressor stop command to drive the compressor 82 again, and up until the timer set time the compressor 82 is controlled for operation as in the case of of FIG. 3, and then both the motors 76, 82 stop at the timer set time (S-56), the air conditioner is thus shut down totally (S-67).

Meanwhile, in the case of ordinary operation where time is not set on the timer, operations of S-50 to S-55, S-57, S-58, or S-60 of FIG. 2 are repeated until the stop switch 59 is depressed.

Accordingly, in the air conditoner of above-described application, while room temperature is approaching 25° C. which is lower than the set temperature 27° C. by predetermined temperature 2° C., the fan motor 76 is kept running and the motor 82 is controlled for operation to a selective operation for cooling and blast as in the case of other prior art, however, when room temperature drops to 25° C., not only the compressor 82 but also the fan motor 76 comes to stop, an unnecessary blast operation can thus be stopped to an economy in electricity, and also a cold caught while asleep due to an unnecessary blast at the time of timer operation can be prevented.

Then, when room temperature rises again to 27° C. after having dropped once to 25° C., the fan motor 76 and the compressor 82 will be driven again before the timer set is over, and room temperature can be controlled by carrying out cooling operation and blast operation selectively.

As described above, the prior art air conditioner is only modifying a set temperature at a constant amount at the time of inputting "when hot" switch and "when cold" switch, therefore room temperature does not change right away, the set temperature is not taken so modified immediately after the input, and reinputting "hot" switch and "cold" switch does not obtain an optimum set temperature for users.

BRIEF SUMMARY OF THE INVENTION

The present invention has been done for removing the aforementioned problem, therefore it is a first object of the invention to provide an air conditioner which is sensitive and hence ready for operation from inputting the thermal sense directly by a user and thus is capable of providing a comfortable environment finally. Further, a second object of the invention is to provide an air conditioner which is ready for setting automatically a sensible temperature to last constant at all times particularly in case where persons in a room may feel colder or hotter than the temperature set on the air conditioner.

The air conditioner relating to the invention has a plurality of switch parts indicating a thermal sense and for transmitting a corresponding signal to a signal detection means and also has a signal detection means comprising a set temperature decision means for deciding a set temperature according to the switch parts and a temperature detector.

In the air conditioner of the invention, where there arises a switch input according to a user's thermal sense, the set temperature is modified by the set temperature decision means with reference to a temperature detected on the temperature detector.

Further in the air conditioner, a construction is such that when a sensible temperature obtained through a sensible temperature computing means is higher than the set temperature, a compressor is stopped operating by a control means, but when the situation is inverse, the compressor will be operated on.

The control means in the invention stops the compressor operating when the sensible temperature comes higher than the set temperature but keeps the compressor going when the situation is inverse, thus controlling room temperature to fix the sensible temperature.

BRIEF DESCRIPTION OF THE DRAWINGS

FIGS. 2, 3 (a) to (c) and FIGS. 4 (a) to (c) all pertain to the circuit of FIG. 1;

FIGS. 6, 7 and 8 pertain to the embodiment of FIG. 5;

DETAILED DESCRIPTION OF PREFERRED EMBODIMENTS

Figure 1:
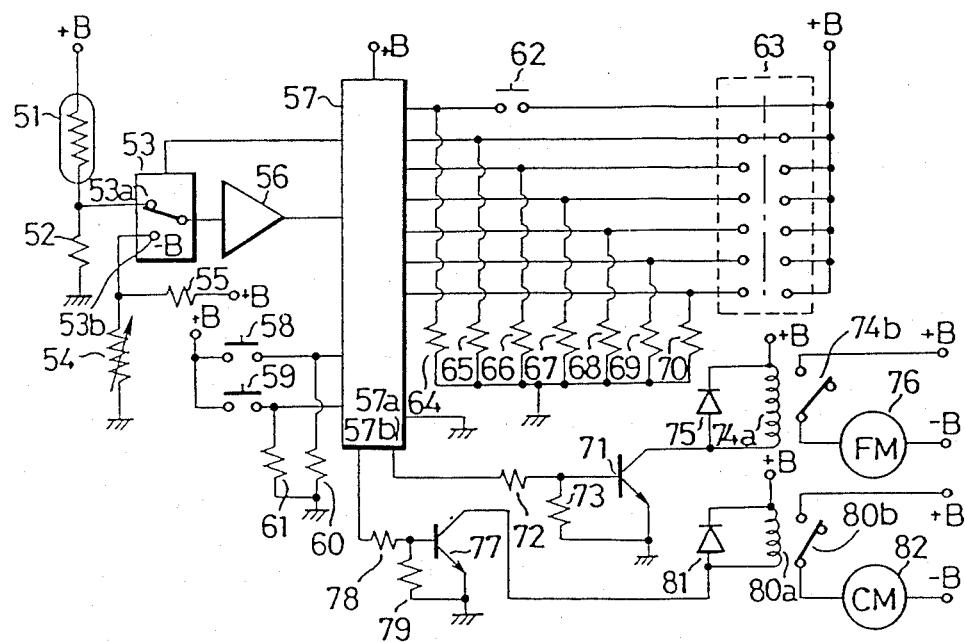
FIG. 1 is a conventional drawing representing a control circuit of an air conditioner.
Figure 2:
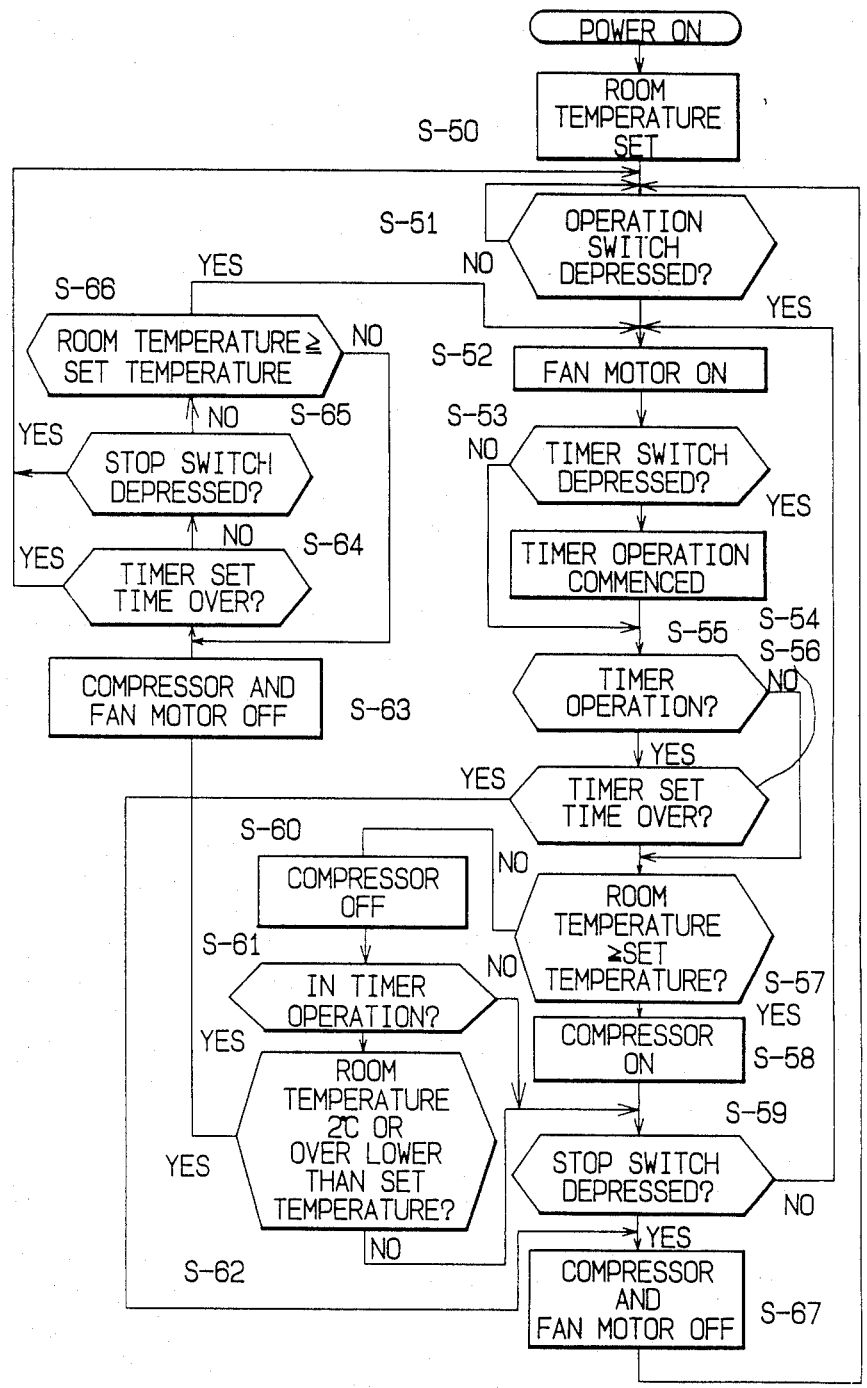
FIG. 2 is a performance flowchart.
Figure 3:
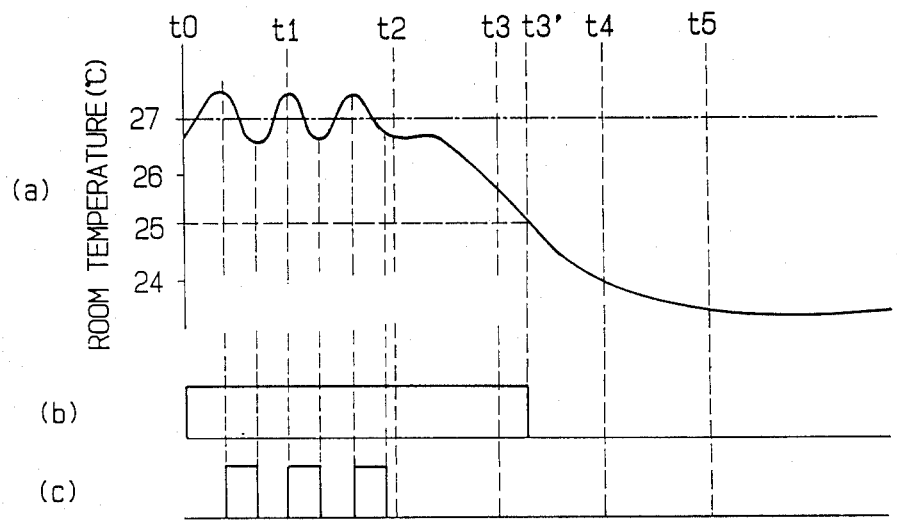
FIG. 3 (a) to (c) and FIG. 4 (a) to (c) are timing charts each.
Figure 4:
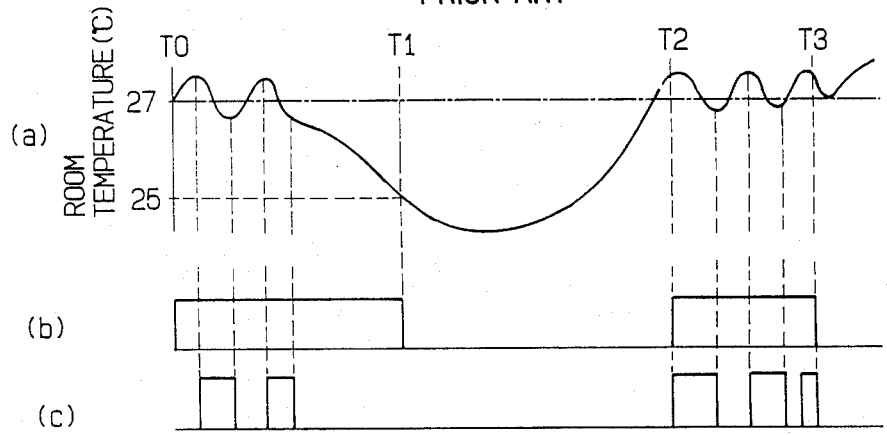
Figure 5:
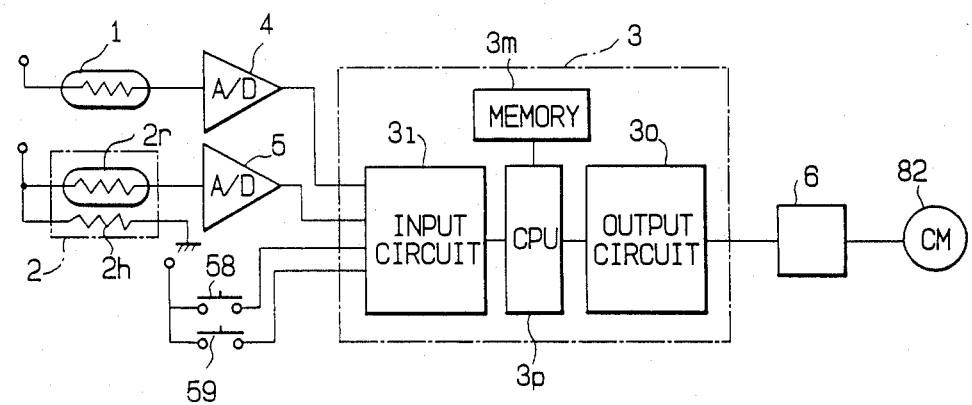
FIG. 5 is a drawing representing a first embodiment of the invention.

Another embodiment of the invention will then be described with reference to the drawings. In FIG. 5, reference numerals 58 and 59 denote a start and a stop switch respectively, and 82 denotes a compressor motor. A reference numeral 1 denotes a thermoresistance element working as a room temperature detecting sensor. A reference numeral 2 denotes a room radiant air current mixing detector, which is constituted of a thermoresistance element 2r and a heater 2h for heating the thermoresistance element 2r, a temperature drop is indicated each correspondingly to an activation energy outflow and an air current velocity, and a temperature rise value due to the heater where the air does not flow is specified as a reference temperature rise value. A reference numeral 3 denotes a microcomputer working as a sensible temperature computing means and a control means, which is constituted of an input circuit 3i, an output circuit 3o, CPU 3p and a memory 3m, a sensible temperature is computed from a room temperature information inputted from the thermoresistance element 1 through an A/D converter 4 and the input circuit 3i and a radiant temperature inputted from the room radiant air current mixing detector 2 through an A/D converter 5 and the input circuit 3i, and when the computed sensible temperature is higher than the set temperature, the compressor 82 is stopped operating through a compressor feeding circuit 6, but if it is lower, the compressor 82 is kept operating. The memory 3m stores information of the reference temperature rise value.

Figure 6:
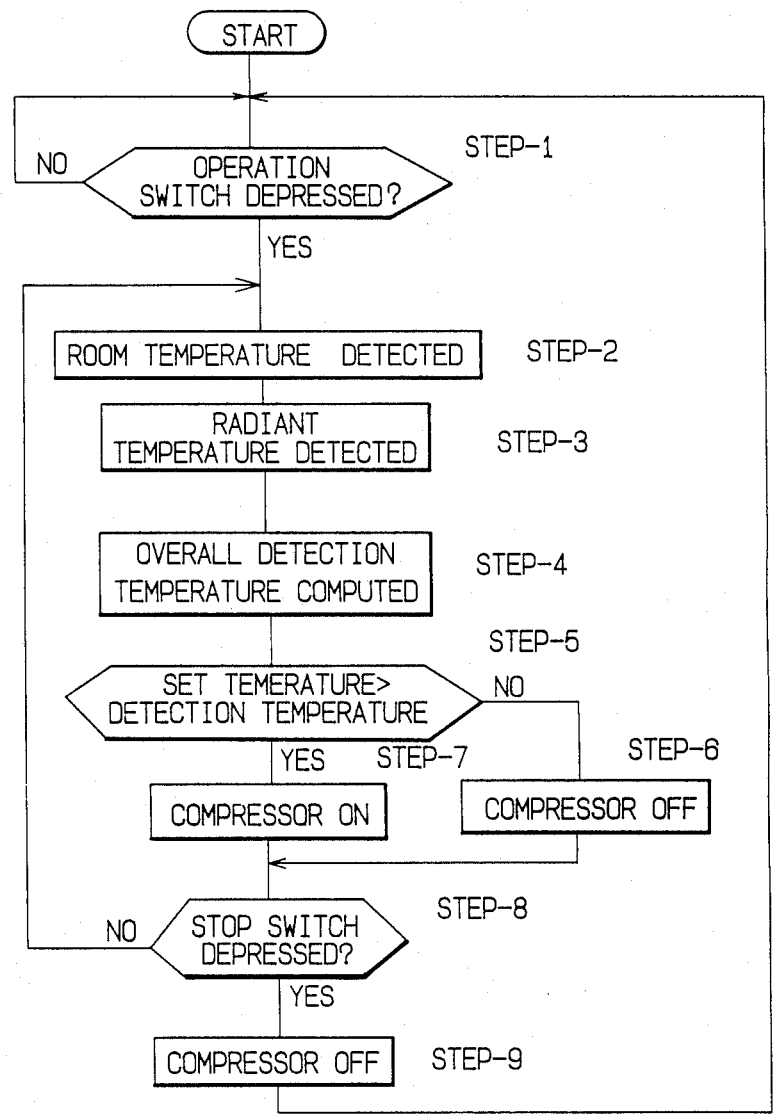
FIG. 6 is a performance flowchart.

Next, an operation will be described with reference to the flowchart of FIG. 6.

Upon turning the operation switch 58 FIG. 5, on (STEP-1), room temperature is detected by the thermoresistnce element 1 (STEP-2), a radiant temperature is detected by the radiant air current mixing detector 2 (STEP-3), and an overall detection temperature (almost equal to the sensible temperature) is computed by the microcomputer 3 through substracting a detected room temperature from the temperature obtainable through multiplying the difference between the reference temperature rise value stored in the memory 3m and the radiant temperature rise value by a constant (STEP-4). Next, the computed overall detection temperature is compared with the set temperature (STEP-5), and where the overall detection temperature is higher than the set temperature, the compressor 82 is stopped operating by the microcomputer 3 through the compressor feeding circuit 6 (STEP-6), but if the overall detection temperature is lower than the set temperature to the contrary, the compressor 82 is operated (STEP-7) to equalize room temperature with the set temperature.

When the stop switch is turned on during the control of room temperature (STEP-8), the compressor 82 is stopped by the microcomputer 3 (STEP-9), and the compressor 82 is kept on standby until the operation switch 58 is turned on.

Figure 7:
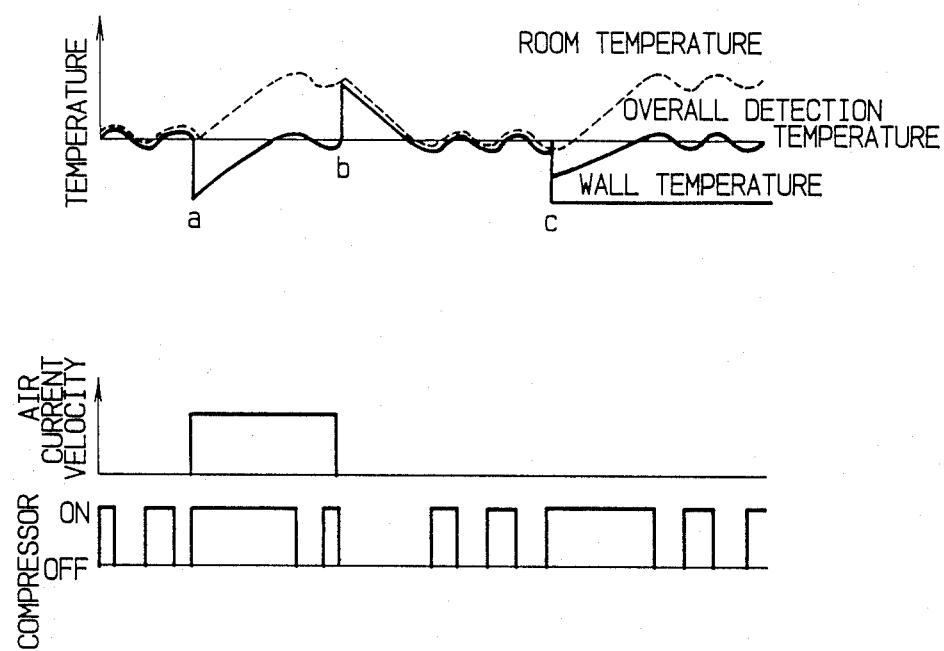
FIG. 7 is a timing chart of a compressor.

Referring to a relation between room temperature and the overall detection temperature when the air conditioner is operated for heating, an increasing air current velocity may drop the overall detection temperature by a temperature equal to the temperature drop sensible by the air current, and then the compressor 82 is kept going continuously until the overall detection temperature reaches the set temperature. Then, when the air current velocity decreases to the contrary, the overall detection temperature rises by a temperature equal to the temperature sensible by the air current, and the compressor 82 is stopped operating until the overall detection temperature reaches the set temperature. Further, when wall temperature drops, the overall detection temperature drops by a temperature equal to the temperature drop sensible by wall temperature (FIG. 7).

In the above-described embodiment, the reference temperature rise value uses information loaded in the memory 3m beforehand, however, a reference temperature rise value detected as below may be used.

Figure 8:
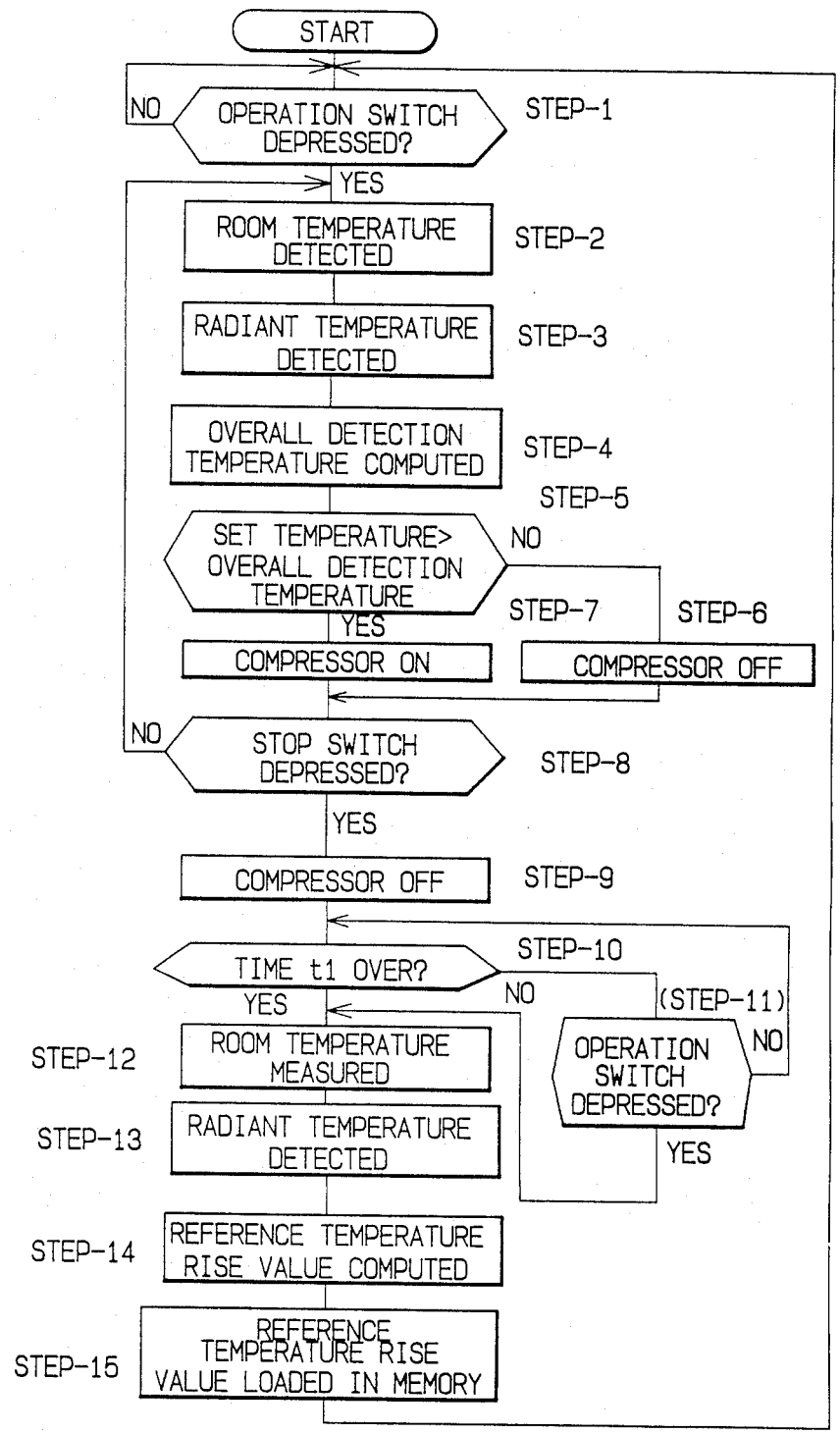
FIG. 8 is a performance flowchart.

Referring to the flowchart of FIG. 8 (STEP-1 to STEP-9 being identical to the operations given in FIG. 6 in the flowchart), the stop switch 59 is turned on (STEP-8), and after the compressor 82 is stopped operating (STEP-9), when the operation switch 58 is turned on (STEP-11) before or after t1 (STEP-10), room temperature and the radiant temperature are detected by the thermoresistance element 1 and the radiant air current mixing detector 2 (STEP-12, 13), the reference temperature rise value is computed by the microcomputer 3 (STEP-14), and the value is loaded in the memory 3m (STEP-15). Since the reference temperature rise value thus obtained has little dispersion, a relative precision error with room temperature according to the thermoresistance element 1 is minimized, and thus temperatures can be controlled more accurately.

Further in the above-described embodiment, the description refers to a case where the room radiant air current mixing detector 2 is used, however, a similar effect will be obtainable from computing the overall detection temperature according to the radiant temperature and the air current velocity computed by a radiation detector and an air current detector respectively.

In the above-described embodiment, still further, the case wherein the overall detection temperature is computed according to room temperature and radiant temperature, and room temperature is controlled according to the computed temperature is taken up for description, however, even in such room controlled as above, when an outer air temperature drops, a temperature on the lower portion also drops in the room, but a temperature on the upper portion rises, therefore a person feels as if he were in the air lower than a mean room temperature in such condition.

Figure 9:
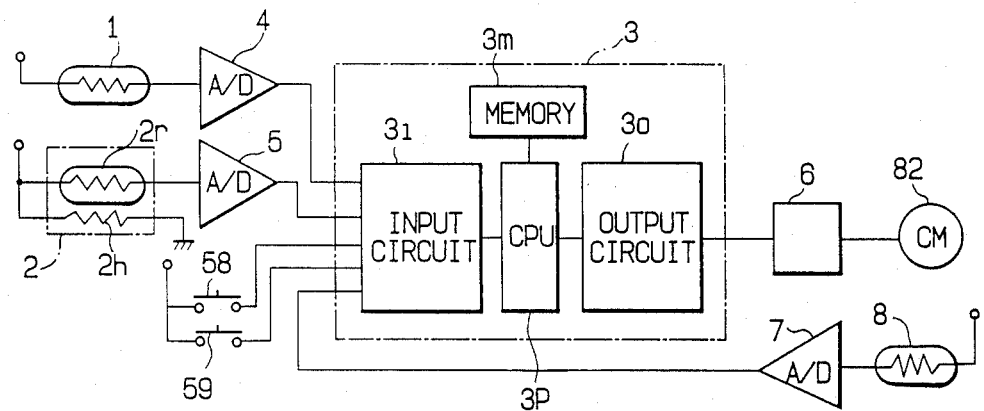
FIG. 9 is a drawing representing another embodiment.
Figure 10:
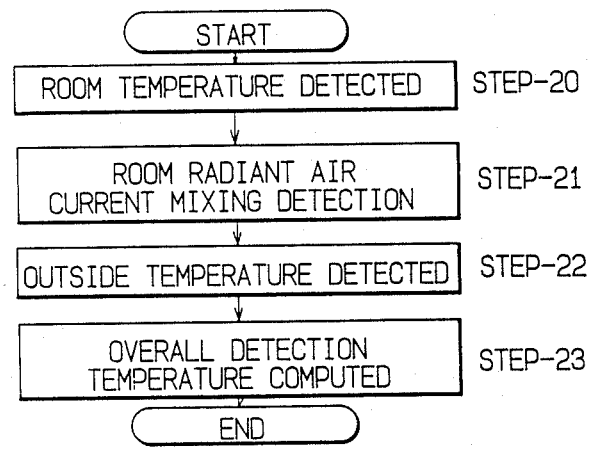
FIG. 10 is a performance flowchart for the embodiment of FIG. 9.

FIG. 9 represents an example of the air conditioner having such point improved accordingly. In the drawing, like reference characters represent like parts. Referring now to the flowchart shown in FIG. 10, an arrangement is such that room temperature is detected by the thermoresistance element 1 (STEP-20), a radiant temperature is detected by the room radiant air current mixing detector 2 (STEP-21), and an outer air temperature is detected by a thermoresistance element 8 through an A/D converter 7 (STEP-22), therefore a temperature closer to the sensible temperature can be computed (STEP-23), thus controlling room temperature moderately.

Figure 11:
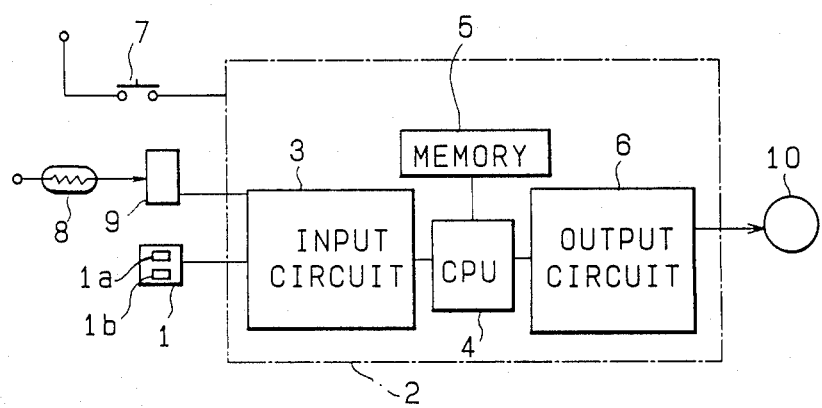
FIG. 11 is an electric circuit diagram of a prior art air conditioner.
Figure 12:
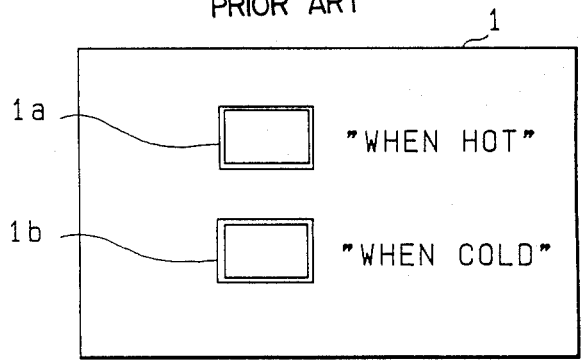
FIG. 12 is a block diagram of a switch part thereof.
Figure 13:
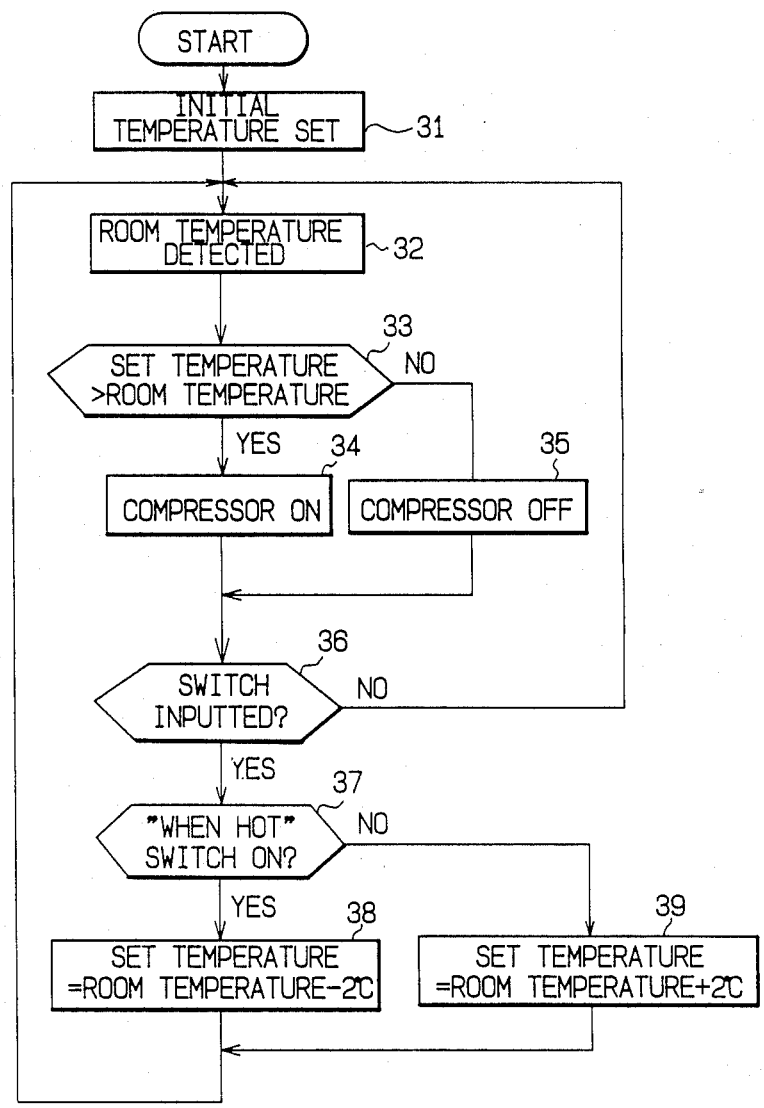
FIG. 13 is a performance flowchart thereof.
Figure 14:
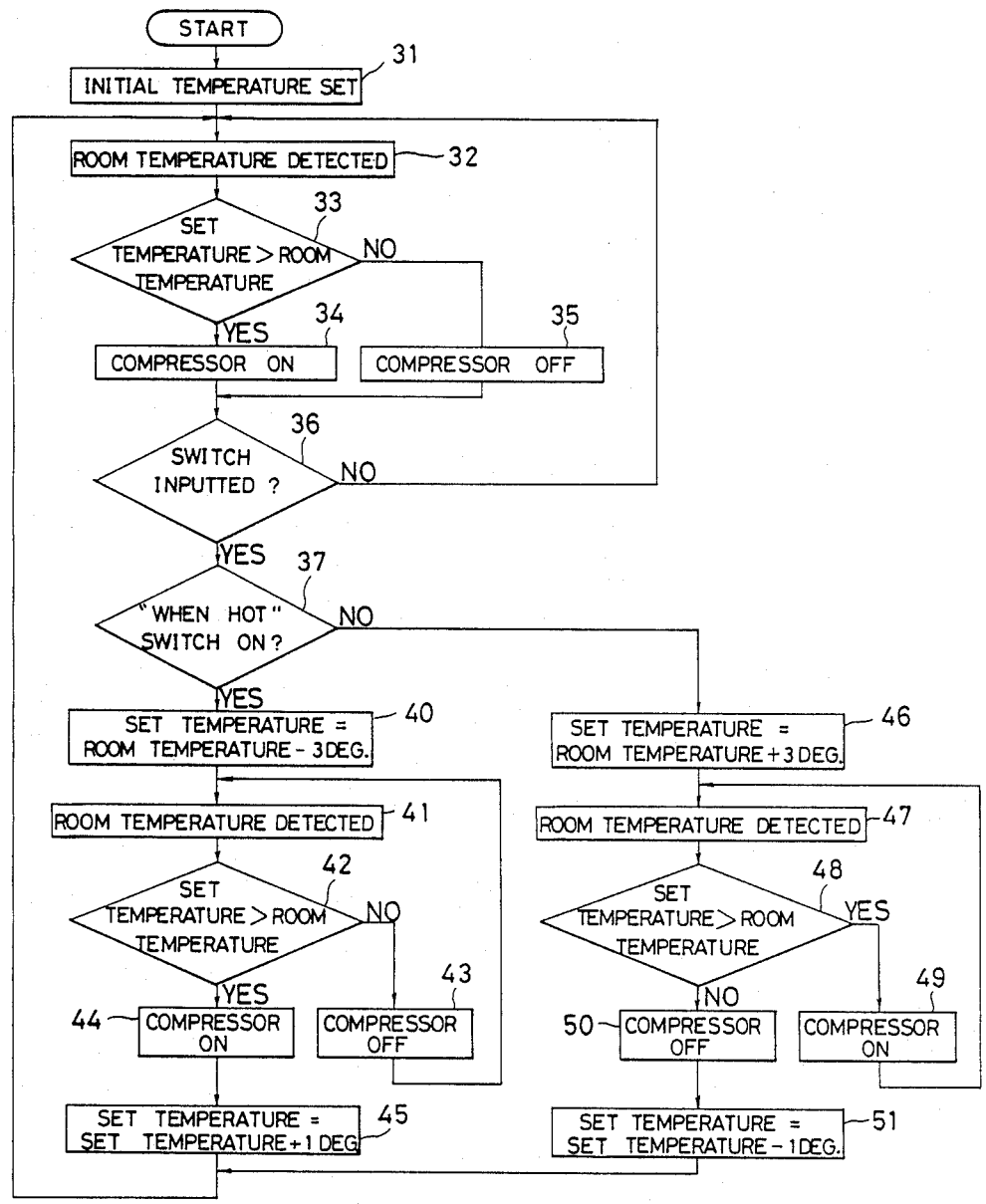
FIG. 14 is an embodiment of the air conditioner of the invention.
Figure 15:
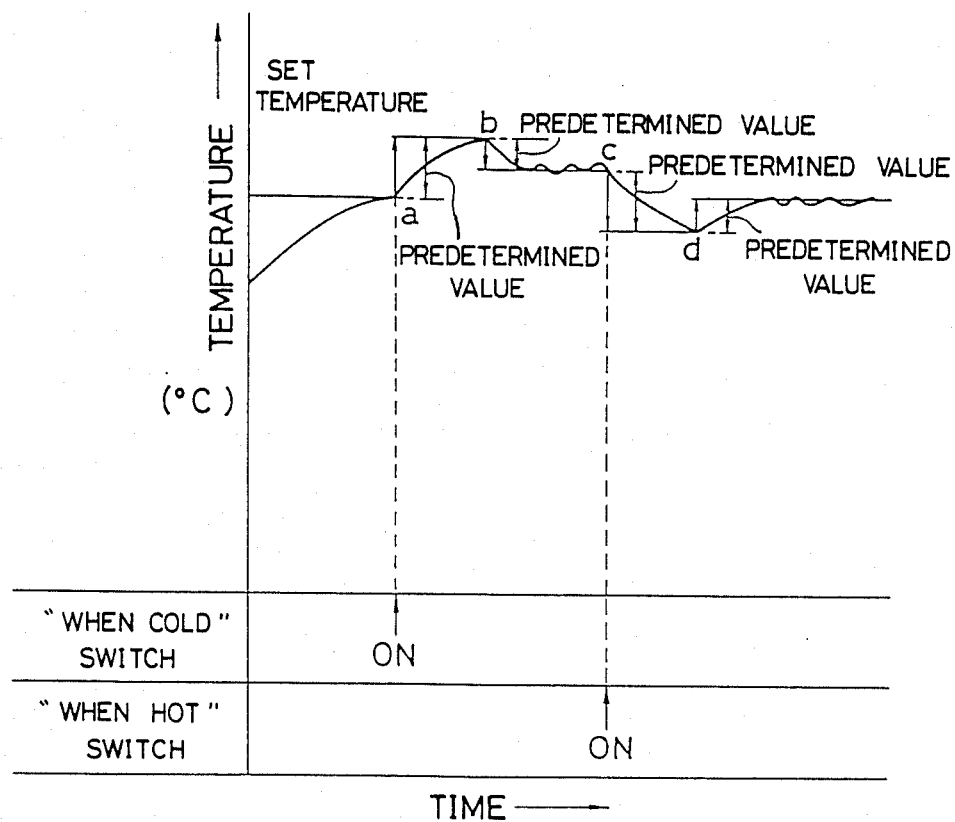
FIG. 15 is an explanatory drawing of the room-temperature change during a heating operation of the embodiment shown in FIG. 14.
Figure 16:
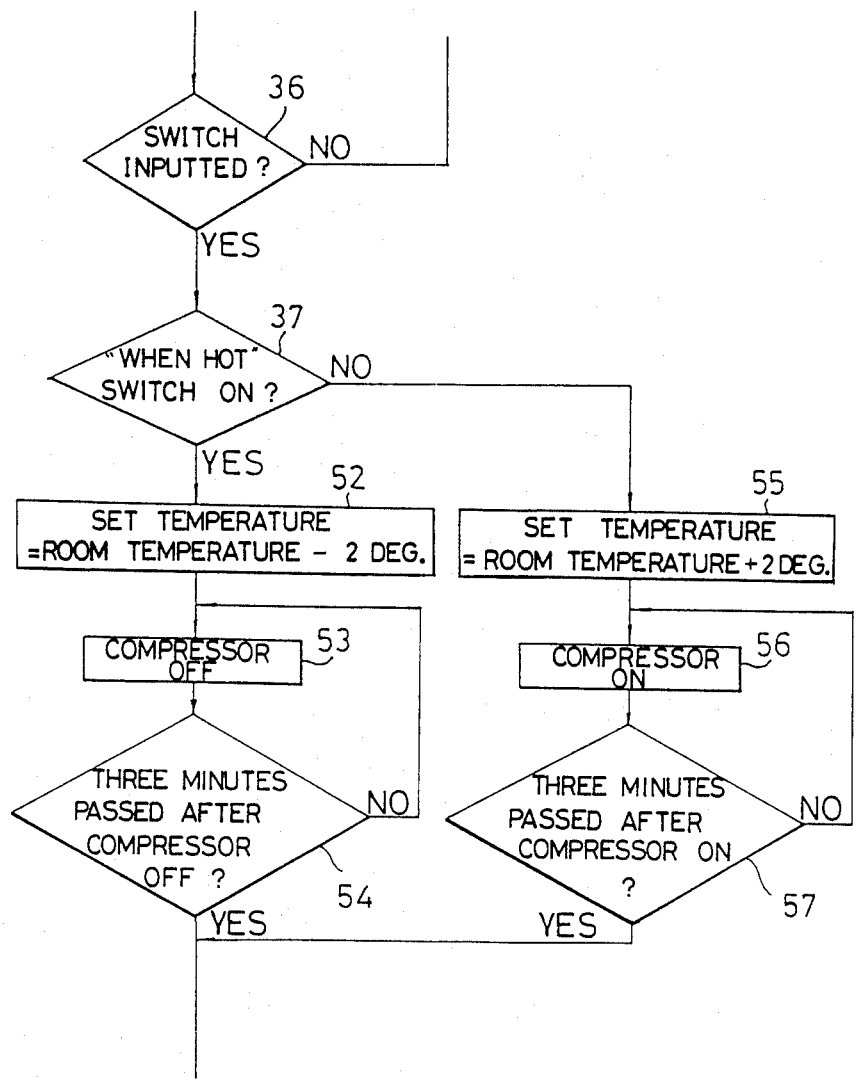
FIG. 16 is a flowchart representing yet another embodiment of this invention.

FIGS. 11, 12 and 13, as described above, relate to a prior art air conditioner with FIG. 13 being a flow control diagram of such a conditioner. FIGS. 14–16, on the other hand, relate to improvements according to the invention in the art shown in FIGS. 11–13. FIGS. 11–13 thus also serve as part of the disclosure of the invention.

In FIG. 14, which is a flowchart, the case of a heating operation is exemplified. For this purpose, STEPS 31–36 are the same steps as shown in FIG. 13, with the reference characters being identical in both figures up to this point. Also, in a similar manner, the "when hot" or "when cold" switch FIGS. 12–13, input is decided at STEP 37.

When the "when hot" switch is on, as decided in STEP 40 IN FIG. 14, the set temperature is lowered by a constant value of 3 degrees C. for example. Then room temperature detected on the termo-resistent element is imputed at STEP 41, and the set temperature and room temperature are compared at STEP 42. This results in an "on" or "off" command to the compressor 10, FIG. 11, being issued through the output circut 6, STEP 43 or 44 according to the operation mode. In a case where the room temperature reaches the set temperature at STEP 42, compressor 10 is turned on at STEP 44, and the set temperature is raised by a constant value of 1 degree C., for example at STEP 45. From then on the compressor is controlled for further operation from STEP 32 at the modified temperature, and thus the environment is controlled to a matching of the set temperature and the room temperature.

If the "when cold" switch is detected at STEP 37 as being on, the set temperature is raised by a constant value of 3 degrees C. for example, with reference to the then room temperature at STEP 46. then the room temperature detected on the thermo-resistent element 8 is inputed at STEP 47, the set temperature and room temperature are compared at STEP 48, and an "on" or an "off" command of the compressor 10 is issued through the output circuit 6, FIGS. 5 or FIG. 9, as STEP 49, 50 according to the operation mode. In a case where the set temperature and the room temperature are equal at STEP 48, the compressor 10 is turned off. The set temperature is then lowered by a constant value of 1 degree at STEP 51. From then on the compressor is controlled for further operation beginning with the flow, STEP 32, at the modified set temperature. Thus the environment is controlled to fixation of the set temperature and room temperature.

FIG. 15 is an explanatory drawing of the room temperature. change during a heating operation of an embodiment of this invention. When a user feels cold at the room temperature at Point a, which is nearing the set temperature, and the user depresses the "when cold"

switch, the latter signal is inputed to the computer, and the set temperature is adjusted to a temperature higher than the then room temperature. When the room temperature reaches the set temperature, the set temperature is then further adjusted to a temperature lower by a predetermined value, but of smaller scope, than the predetermined value of the set temperature at point b, enabling the room temperature and the "new" set temperature to form the basis for further control of the unit.

Inversely, in the case when the "when hot" switch is inputed, the set temperature is adjusted to a temperature lower by a predetrmined value point c, FIG. 15, and when the room temperature reaches the set temperature at point d, operation from there on is at a temperature slightly higher than the set temperature i.e. at 1 degree higher.

In the embodiment described immediately above, when the "when hot" or the "when cold" switch is inputed, a change of 3 degrees either plus or minus is instituted at STEPS 40-46 of FIG. 14. However, a similar effect can be otained by forcing the compressor 10 on or off for a certain period of time. FIG. 16 is a flowchart showing an embodiment wherein when the "when hot" switch is inputed at STEP 37, the set temperature is lowered by a predetermined value of the room temperature, or 2 degrees C. at STEP 52, the compressor 10 is shut off for a certain time, such as 3 minutes at STEP 53, 54, and then the program is recycled to STEP 32. Furthermore, when the "when cold" switch is imputed at STEP 37, the set temperature is raised by a predetermined value of the room temperature, such as 2 degrees C. at STEP 5, the compressor 10 is then turned off for a certain time of 3 minutes at STEP 56, 57 and then the cycle is restrated at STEP 32.

While the immediately above description fully covers the case of the heating operation, in the case of the cooling operation, the "on" and "off" operation of the compressor can be reversed.

As described above, according to the invention, the thermal sense of a user is inputted, and a set temperature is adjusted automatically to the input, therefore a comfortable environment meeting user's requirements more simply and readily as well can be provided thereby.

According to the invention, furthermore, the construction is such that when heating the sensible temperature is computed, and when the sensible temperature is higher than a set temperature, the compressor is stopped operating, but if lower to the contrary, the compressor is operated to control room temperature, therefore the sensible temperature can be kept constant to a further effect.

What is claimed is:

1. An air conditioner provided with a temperature detector for detecting room temperature, a switch input part having a first input means mannually operable for indicating in a thermal sense when a user feels "hot" and a second input means for indicating in a thermal sense and transmitting a corresponding signal into a signal detection means when a user feels "cold", a signal detecting means comprising set temperature decision means in signal detecting association with both said input means and said temperature detector for deciding and establishing a set temperature according to inputs of said temperature detector and said switch input part, which is characterized in that said set temperature decision means adjusts a first set temperature previously established thereby to a second set temperature lower by a predetermined value with reference to a then room temperature, and thereafter raises said second set temperature somewhat after reaching said second set temperature when said first input means is operated, but adjusts said first set temperature to a third set temperature higher by a predetermined value with reference to a then room temperature and thereafter lowers said third set temperature somewhat after reching said third set temperature, when said second input means is operated.

2. The air conditioner as defined in claim 1, wherein said set temperature decision means adjust said first set temperature to a second set temperature lower by a predetermined value with reference to a then room temperature, continues operation of the air conditioner for a predetermined period of time concurrently, and then operates said air conditioner at said somewhat raised second set temperature thereafter, when said first input means is operated but adjusts said first set temperature to a third set temperature higher by a predetermined value with reference to said then room temperature, continues operation of the said air conditioner for a predetermined period of time concurrently, and then operates said air conditioner at said somewhat lowered third set temperature, when said second input means is operated.

* * * * *